No. 884,626. PATENTED APR. 14, 1908.
J. E. SWENDEMAN.
STEAM TRAP.
APPLICATION FILED APR. 15, 1907.

2 SHEETS—SHEET 2.

United States Patent Office.

JOSEPH E. SWENDEMAN, OF BOSTON, MASSACHUSETTS.

STEAM-TRAP.

No. 884,626.   Specification of Letters Patent.   Patented April 14, 1908.

Application filed April 15, 1907. Serial No. 368,225.

*To all whom it may concern:*

Be it known that I, JOSEPH E. SWENDEMAN, a citizen of the United States, residing at Boston, in the county of Suffolk and State of Massachusetts, have invented new and useful Improvements in Steam - Traps, of which the following is a specification.

This invention relates to improvements in steam traps and the objects are to effect a gradual opening and closing of the outlet valve according to the amount of condensation, to prevent concussion or hammering, and to provide a simple compact mechanism which will open the valve against high pressure.

The invention consists in the combination and arrangement of parts set forth in the following specification and particularly pointed out in the claims thereof.

Figure 1:
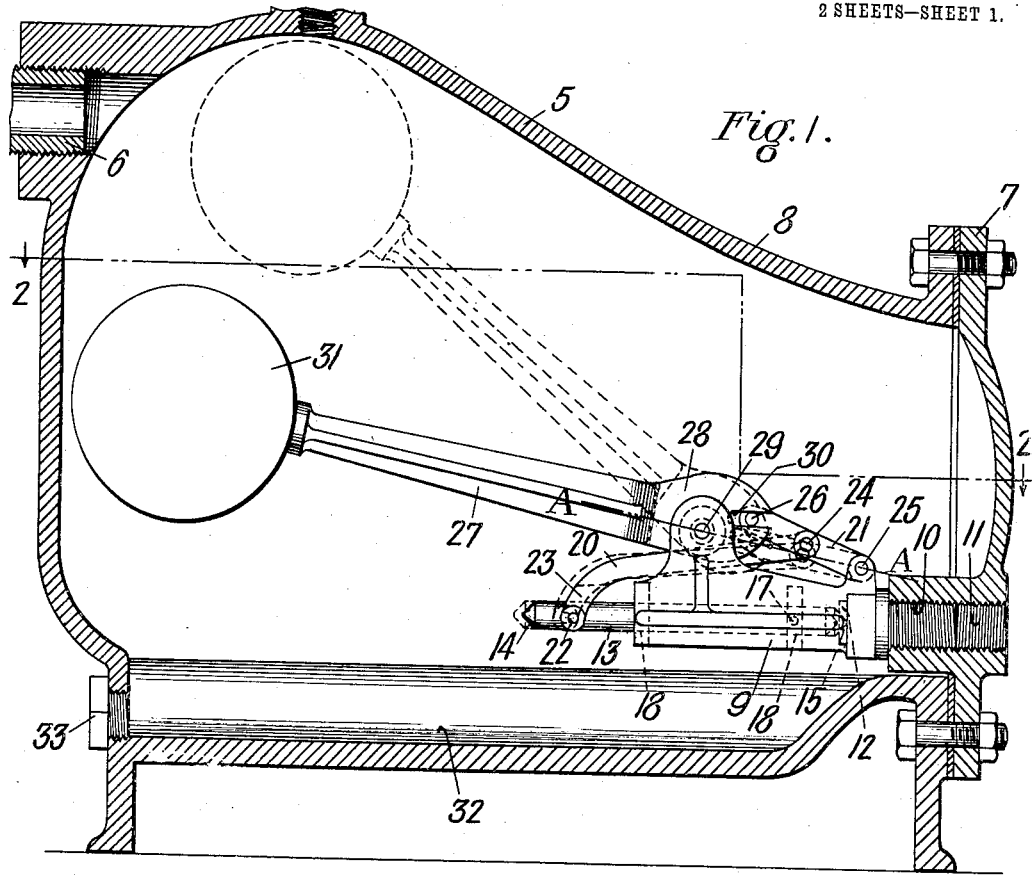
Figure 2:
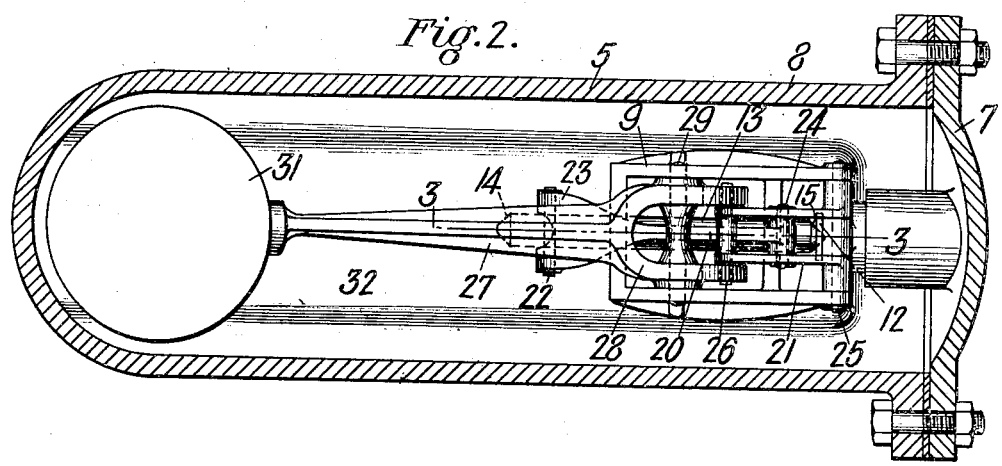
Figure 3:
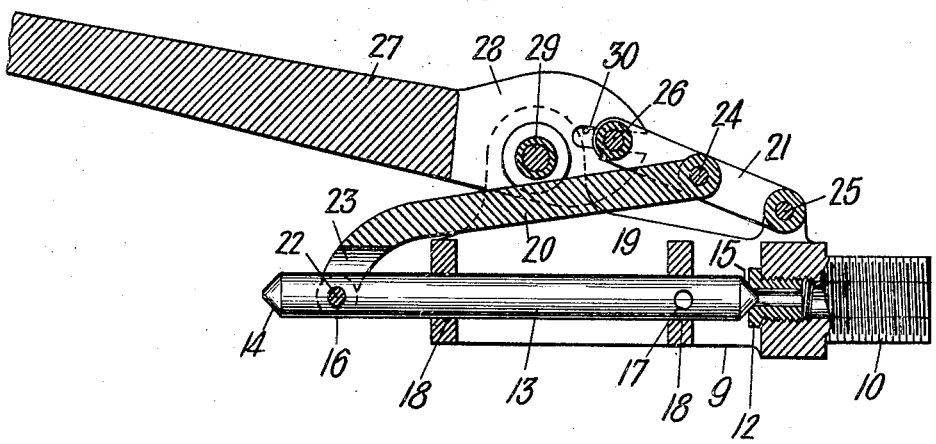

Referring to the drawings: Figure 1 is a central longitudinal sectional elevation of a steam trap embodying my invention, the valve operating mechanism being shown in full lines in the position which it occupies when the valve is closed and in dotted lines in the open position. Fig. 2 is a plan section taken on line 2—2 of Fig. 1. Fig. 3 is an enlarged detail section, partly in elevation, taken on line 3—3 of Fig. 2.

Like numerals refer to like parts throughout the several views of the drawings.

In the drawings, 5 is a shell or reservoir and 6 is an inlet pipe through which the steam and water of condensation from the radiators of a heating plant or other source may enter the trap. A cover plate 7 forming a part of the shell 5 is bolted to the body portion 8 of said shell in such a manner as to make the device easily assembled or disassembled. A support 9 is provided with a screw-threaded stem or pipe 10 which is screwed into an outlet hole 11, said outlet hole being adapted to be connected with a pipe through which the water from the trap passes to a hot-well, tank, or other receiver, the outlet 11 being at all times below the surface of the water in the trap. A valve seat 12 is screwed into the support 9 and may be readily removed therefrom and replaced by another in case of wear. A valve member or stem 13 is slidably arranged in the support 9 to move toward and away from the valve seat 12, said member being provided with conical valves 14 and 15 formed on its ends, said member being also provided with holes 16 and 17.

The stem 13 is adapted to slide in bearings 18, 18 toward and away from the valve seat 12.

19 is a toggle consisting of a long member 20 and a short member 21, said long member being pivotally connected to the valve stem 13 by a pin 22 which passes through said stem and through a fork 23 formed on said member. The member or link 20 is pivoted at 24 to the member or arm 21 between the ends of said arm. The arm 21 is pivoted at 25 to the support 9, the other end of said arm being provided with a pin 26 which passes therethrough. A float lever 27 is provided with a forked end 28 pivoted at 29 to the support 9, said forked end being provided with slots 30, 30 in which the ends of the pin 26 are located. A hollow float 31 is fast to the float lever 27 and as the level of the water in the shell 5 is raised and lowered said float is adapted to rock said float lever on its pivot 29.

In Fig. 1 the parts are shown in full lines when the float 31 is in its lowermost position and the valve 15 in contact with the seat 12, while the dotted lines show the position that the parts occupy when the float 31 is in its uppermost position. The shell 5 is provided at the bottom with a sediment chamber 32 which consists in a depression extending longitudinally of said shell there being a screw plug 33 which may be removed in order to remove sediment therefrom.

The general operation of the trap hereinbefore specifically described is as follows: The parts being in the position shown in full lines, Fig. 1, with the water at its lowest level and the valve 15 against the seat 12, as the water of condensation begins to fill the shell or reservoir 5 the float 31 rises thereby rocking the float lever 27 on its pivot, thereby acting through the toggle 19 to gradually move the valve 15 away from its seat 12. It will be seen that as the float 31 rises toward the position shown in dotted lines the pivotal pins 26 and 24 approach a plane A—A containing the axes of the pivotal pins 25 and 29 and when the parts have reached the position shown in dotted lines it will be seen that the axes of all of said pins lie in said plane A—A. It will be seen by this arrangement great power is obtained and the mechanism is capable of opening the valve against great pressure. It will also be understood that the valve is moved positively in both directions and that its opening and closing is gradual, thereby eliminating any concussion or hammering.

Having thus described my invention what I claim and desire by Letters Patent to secure is:

1. In a steam trap a reservoir having an inlet and an outlet orifice, an outlet valve seat, an outlet valve movable toward and away from said seat, a pivoted float lever provided with a slot, a float connected to said float lever, and a toggle having one member connected to said valve and the other to a fixed support, one of said members being provided with a projection located in said slot.

2. In a steam trap a reservoir having an inlet and an outlet orifice, an outlet valve seat, a fixed support, an outlet valve having a stem slidably arranged in said support to move toward and away from said seat, a float lever pivotally mounted on said support, an arm connected at one end to said float lever, and at its other end pivotally connected to said support, and a link pivotally connected at one end to said stem and at its other end pivotally connected to said arm between the ends of said arm.

3. In a steam trap a reservoir having an inlet and an outlet orifice, an outlet valve seat, a fixed support, an outlet valve having a stem slidably arranged in said support to move toward and away from said seat, a float lever pivotally mounted on said support, said lever provided with a slot, an arm provided at one end with a projection located in said slot, the other end of said arm being pivotally connected to said support, and a link pivotally connected at one end to said stem and at its other end pivotally connected to said arm.

4. In a steam trap a reservoir having an inlet and an outlet orifice, an outlet valve seat, a fixed support, an outlet valve having a stem slidably arranged in said support to move toward and away from said seat, a float lever pivotally mounted on said support, said lever provided with a slot, an arm provided at one end with a projection located in said slot, the other end of said arm being pivotally connected to said support, and a link pivotally connected at one end to said stem and at its other end pivotally connected to said arm between the ends of said arm.

5. In a steam trap a reservoir having an inlet and an outlet orifice, an outlet valve seat, a fixed support, an outlet valve having a stem slidably arranged in said support to move toward and away from said seat, a float lever having a forked end pivotally mounted on said support, said end being provided with slots, an arm which said forked end straddles, one end of said arm being provided with projections located in said slots, the other end of said arm being pivotally connected to said support, and a link pivotally connected at one end to said stem and at its other end pivotally connected to said arm.

In testimony whereof I have hereunto set my hand in presence of two subscribing witnesses.

JOSEPH E. SWENDEMAN.

Witnesses:
HENRY J. BOTCHFORD,
LOUIS A. JONES.